(12) United States Patent
McCarthy et al.

(10) Patent No.: US 12,411,984 B2
(45) Date of Patent: Sep. 9, 2025

(54) APPLYING A K-ANONYMITY MODEL TO PROTECT NODE LEVEL PRIVACY IN KNOWLEDGE GRAPHS AND A DIFFERENTIAL PRIVACY MODEL TO PROTECT EDGE LEVEL PRIVACY IN KNOWLEDGE GRAPHS

(71) Applicant: Accenture Global Solutions Limited, Dublin (IE)

(72) Inventors: Nicholas McCarthy, Dublin (IE); Jeremiah Hayes, Dublin (IE); Xu Zheng, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 1118 days.

(21) Appl. No.: 17/247,381

(22) Filed: Dec. 9, 2020

(65) Prior Publication Data

US 2022/0180226 A1 Jun. 9, 2022

(51) Int. Cl.
*G06F 21/62* (2013.01)
*G06N 5/04* (2023.01)
*G06N 20/00* (2019.01)

(52) U.S. Cl.
CPC ........... *G06F 21/6254* (2013.01); *G06N 5/04* (2013.01); *G06N 20/00* (2019.01)

(58) Field of Classification Search
CPC . G06F 21/6254; G06F 16/9024; G06N 20/00; G06N 5/04
See application file for complete search history.

(56) References Cited

U.S. PATENT DOCUMENTS

| | | | |
|---|---|---|---|
| 11,810,001 B1* | 11/2023 | Tang | G06N 5/022 |
| 2014/0189858 A1* | 7/2014 | Chen | G06F 21/6254 726/22 |
| 2014/0324915 A1* | 10/2014 | Gkoulalas-Divanis | G06F 21/6254 707/803 |
| 2018/0314756 A1* | 11/2018 | Wang | G06F 16/334 |
| 2019/0087604 A1* | 3/2019 | Antonatos | G06F 21/6245 |
| 2019/0130129 A1 | 5/2019 | Huang | |
| 2019/0130130 A1* | 5/2019 | Huang | G16H 10/60 |
| 2019/0220524 A1* | 7/2019 | Costabello | G06F 16/24578 |
| 2019/0228183 A1* | 7/2019 | Choi | G06F 21/62 |

(Continued)

OTHER PUBLICATIONS

Extended European Search Report for Application No. EP21202621, mailed on Mar. 25, 2022, 9 pages.

*Primary Examiner* — Jeremy S Duffield
(74) *Attorney, Agent, or Firm* — POLSINELLI PC

(57) ABSTRACT

A device processes a knowledge graph to select a set of triples and generates a first class based on the set of triples. The device determines a quantity of quasi-identifier attributes in the first class and compares the quantity to a predefined parameter. The device embeds the knowledge graph to generate an embedding space representation, identifies a second class, and determines a first quantity of nodes in the first class and the second class. The device compares the first quantity to the predefined parameter and identifies a third class. The device determines a second quantity of nodes in the first class and the third class and compares the second quantity to the predefined parameter. The device merges the second class or the third class with the first class, based on the comparisons, to generate anonymized nodes for the knowledge graph.

16 Claims, 10 Drawing Sheets

100 ⟶

Client device

105
Receive a knowledge graph, a predefined parameter, a sensitivity parameter, a noise multiplier parameter, and an acceptance value 110
Process the knowledge graph, with a quasi-identifier relation model, to select triples in the knowledge graph Anonymization system

(56) References Cited

U.S. PATENT DOCUMENTS

| | | | |
|---|---|---|---|
| 2020/0242444 A1* | 7/2020 | Zhang | G06N 3/042 |
| 2020/0311296 A1 | 10/2020 | Kim et al. | |
| 2020/0356858 A1* | 11/2020 | Hegde | G06N 3/047 |
| 2021/0200901 A1* | 7/2021 | Vemula | G06F 18/2323 |
| 2021/0336938 A1* | 10/2021 | Karabatis | H04L 63/1475 |

* cited by examiner

APPLYING A K-ANONYMITY MODEL TO PROTECT NODE LEVEL PRIVACY IN KNOWLEDGE GRAPHS AND A DIFFERENTIAL PRIVACY MODEL TO PROTECT EDGE LEVEL PRIVACY IN KNOWLEDGE GRAPHS

BACKGROUND

Differential privacy is a system for publicly sharing information about a dataset by describing the patterns of groups within the dataset (e.g., a distribution of data) while withholding information about individuals in the dataset. A model may be referred to as a differentially private model if an observer seeing output of the model cannot tell if a particular individual's information was used to compute the output. Differential privacy is often discussed in the context of identifying individuals whose information may be in a database. Differentially private models may be used, for example, to publish demographic information or other statistical aggregates while ensuring confidentiality of survey responses, and/or to collect information about user behavior while controlling what information is visible.

SUMMARY

In some implementations, a method may include receiving a knowledge graph and a predefined parameter and processing the knowledge graph, with a set of quasi-identifier relations, to select a set of triples in the knowledge graph, each triple in the set of triples including a quasi-identifier relation. The method may include generating an equivalence first class based on the set of triples in the knowledge graph and determining a quantity of quasi-identifier attributes in the first class. The method may include comparing the quantity of quasi-identifier attributes to the predefined parameter to generate a first comparison and embedding the knowledge graph to generate an embedding space representation. The method may include identifying a similar neighbor second class and determining a first quantity of nodes in the first class and the second class. The method may include comparing the first quantity of nodes in the first class and the second class to the predefined parameter to generate a second comparison and identifying a similar neighbor third class. The method may include determining a second quantity of nodes in the first class and the third class and comparing the second quantity of nodes in the first class and the third class to the predefined parameter to generate a third comparison. The method may include merging the second class or the third class with the first class, based on the first comparison, the second comparison, and the third comparison, to generate anonymized nodes for the knowledge graph.

In some implementations, a device includes one or more memories, and one or more processors to receive a knowledge graph and a predefined parameter and process the knowledge graph to select a set of triples, with a set of quasi-identifier relations, to select a set of triples in the knowledge graph, each triple in the set of triples including a quasi-identifier relation. The one or more processors may generate an equivalence first class based on the set of triples in the knowledge graph and may determine a quantity of quasi-identifier attributes in the first class. The one or more processors may compare the quantity of quasi-identifier attributes to the predefined parameter to generate a first comparison and may embed the knowledge graph to generate an embedding space representation. The one or more processors may identify a similar neighbor second class and may determine a first quantity of nodes in the first class and the second class. The one or more processors may compare the first quantity of nodes in the first class and the second class to the predefined parameter to generate a second comparison and may identify a similar neighbor third class. The one or more processors may determine a second quantity of nodes in the first class and the third class and may compare the second quantity of nodes in the first class and the third class to the predefined parameter to generate a third comparison. The one or more processors may merge the second class or the third class with the first class, based on the first comparison, the second comparison, and the third comparison, to generate anonymized nodes for the knowledge graph, and may utilize the knowledge graph, with the anonymized nodes, to perform a calculation that satisfies one or more privacy conditions.

In some implementations, a non-transitory computer-readable medium may store a set of instructions that includes one or more instructions that, when executed by one or more processors of a device, cause the device to receive a knowledge graph and a predefined parameter, and process the knowledge graph, with a set of quasi-identifier relations, to select a set of triples in the knowledge graph, each triple in the set of triples including a quasi-identifier relation. The one or more instructions may cause the device to generate an equivalence first class based on the set of triples in the knowledge graph and determine a quantity of quasi-identifier attributes in the first class. The one or more instructions may cause the device to compare the quantity of quasi-identifier attributes to the predefined parameter to generate a first comparison and embed the knowledge graph to generate an embedding space representation. The one or more instructions may cause the device to identify a similar neighbor second class and determine a first quantity of nodes in the first class and the second class. The one or more instructions may cause the device to compare the first quantity of nodes in the first class and the second class to the predefined parameter to generate a second comparison and identify a similar neighbor third class. The one or more instructions may cause the device to determine a second quantity of nodes in the first class and the third class and compare the second quantity of nodes in the first class and the third class to the predefined parameter to generate a third comparison. The one or more instructions may cause the device to merge the second class or the third class with the first class, based on the first comparison, the second comparison, and the third comparison, to generate anonymized nodes for the knowledge graph, and utilize the knowledge graph, with the anonymized nodes, to determine new knowledge associated with a subject matter of the knowledge graph. The one or more instructions may cause the device to provide data identifying the new knowledge for display.

DETAILED DESCRIPTION

Figure 1A:
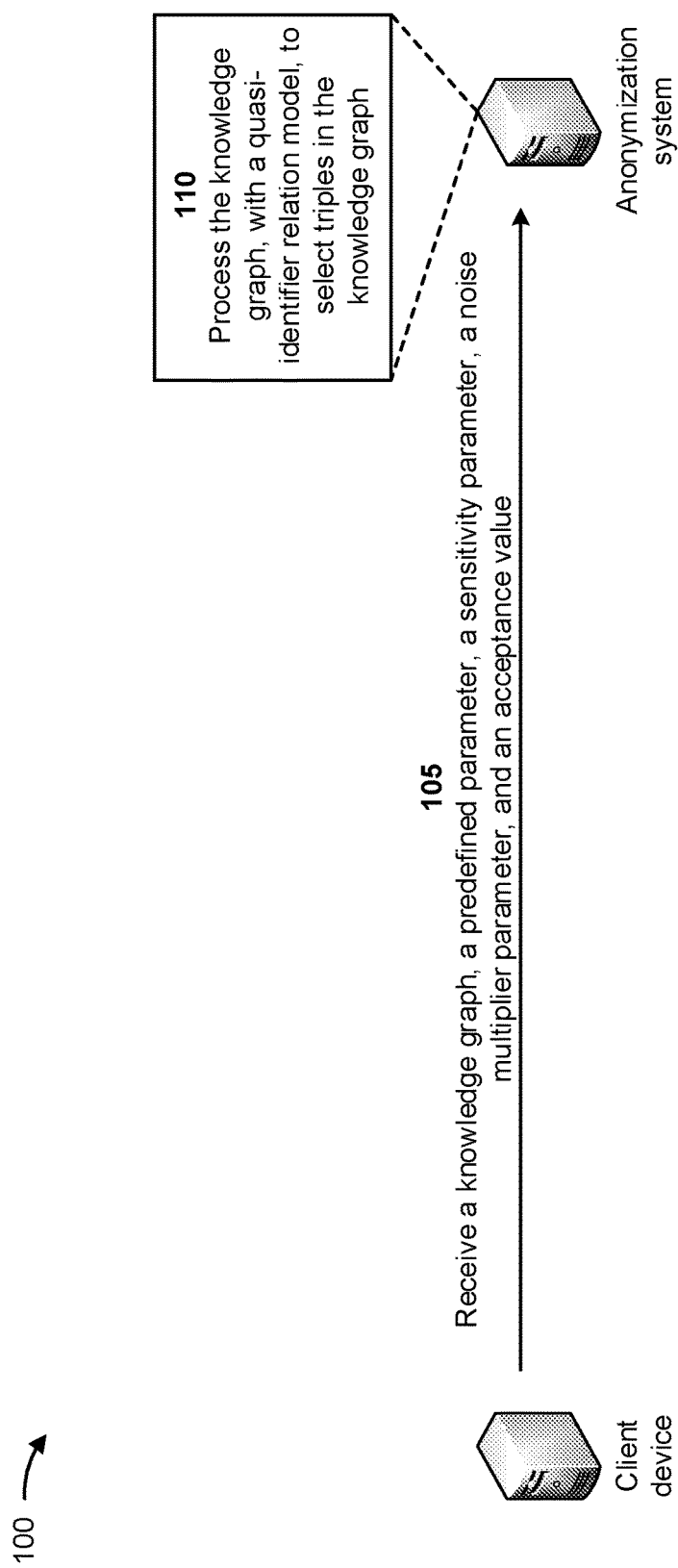
FIGS. 1A-1G are diagrams of an example implementation described herein.

The following detailed description of example implementations refers to the accompanying drawings. The same reference numbers in different drawings may identify the same or similar elements.

Information can be structured in the form of a knowledge graph that include nodes representing entities and edges representing relationships between entities. A knowledge graph acquires and integrates information into an ontology and applies a reasoner to derive new knowledge. In other words, a knowledge graph is a programmatic way to model a knowledge domain with the help of subject-matter experts, data interlinking, and machine learning models. However, maximizing utilization of a knowledge graph data is restricted by data privacy legal compliance requirements. Data privacy technology and models have been applied to standard relational databases and social graph data structures. Currently, there are no frameworks for applying data privacy in the context of knowledge graphs or knowledge graph embeddings. Thus, current methods for utilizing knowledge graphs waste human resources, computing resources (e.g., processing resources, memory resources, communication resources, and/or the like), networking resources, and/or the like associated with violating data privacy legal compliance requirements during utilization of knowledge graphs, unsuccessfully attempting to identify privacy data associated with knowledge graphs, and/or the like.

Some implementations described herein relate to an anonymization system that applies a k-anonymity model to protect node level privacy in knowledge graphs and a differential privacy model to protect edge level privacy in knowledge graphs. For example, the anonymization system may receive a knowledge graph and a predefined parameter and may process the knowledge graph to select a set of triples in the knowledge graph, each triple in the set of triples including a quasi-identifier relation. The anonymization system may generate an equivalence first class based on the set of triples in the knowledge graph and may determine a quantity of quasi-identifier attributes in the first class. The anonymization system may compare the quantity of quasi-identifier attributes to the predefined parameter to generate a first comparison and may embed the knowledge graph to generate an embedding space representation. The anonymization system may identify a similar neighbor second class and may determine a first quantity of nodes in the first class and the second class. The anonymization system may compare the first quantity of nodes in the first class and the second class to the predefined parameter to generate a second comparison and may identify a similar neighbor third class. The anonymization system may determine a second quantity of nodes in the first class and the third class and may compare the second quantity of nodes in the first class and the third class to the predefined parameter to generate a third comparison. The anonymization system may merge the second class or the third class with the first class, based on the first comparison, the second comparison, and the third comparison, to generate anonymized nodes for the knowledge graph.

In this way, the anonymization system may apply a k-anonymity model to protect node level privacy in knowledge graphs and a differential privacy model to protect edge level privacy in knowledge graphs. For example, the anonymization system may utilize a k-anonymization model that leverages a knowledge graph embedding as an approximate means to maximize data utility during a data privatization phase. The anonymization system may incorporate a differential privacy mechanism to provide privacy for sensitive attributes contained in the knowledge graph and may aid an end user in understanding trade-offs in privacy and utility. Thus, the anonymization system conserves human resources, computing resources, networking resources, and/or the like that would otherwise have been wasted by violating data privacy legal compliance requirements during utilization of knowledge graphs, unsuccessfully attempting to identify privacy data associated with knowledge graphs, and/or the like.

FIGS. 1A-1G are diagrams of an example implementation 100 described herein. Example implementation 100 may be associated with utilizing models for replacing existing enterprise software with new enterprise software. As shown in FIGS. 1A-1G, example implementation 100 includes a client device associated with an anonymization system. The client device may include a laptop computer, a mobile telephone, a desktop computer, and/or the like utilized by the user. The anonymization system may include a system that applies a k-anonymity model to protect node level privacy in knowledge graphs and a differential privacy model to protect edge level privacy in knowledge graphs.

As shown in FIG. 1A, and by reference number 105, the anonymization system may receive a knowledge graph, a predefined parameter, a sensitivity parameter, a noise multiplier parameter, and an acceptance value. The knowledge graph may include a graph that acquires and integrates information into an ontology and applies a reasoner to derive new knowledge. In some implementations, the knowledge graph is a programmatic way to model a knowledge domain with the help of subject-matter experts, data interlinking, and machine learning models. Data of the knowledge graph may need to be restricted due data privacy legal compliance requirements. For example, the knowledge graph may include private graph data, such as personal identifiers (e.g., "patient 1101," "person 101," and/or the like), quasi-identifier relations (e.g., "has age," "has nationality," and/or the like), quasi-identifier attributes (e.g., "18," "19," "Irish," "Scottish," and/or the like) associated with the quasi-identifier relations, insensitive attributes, and/or the like.

The predefined parameter may include a k-anonymity value associated with a k-anonymity model to be applied to the knowledge graph. Given privacy-specific (e.g., person-specific) field-structured data, the k-anonymity model may produce data that guarantees that the privacy-specific data (e.g., data identifying individuals) of the produced data cannot be re-identified while the produced data remains useful. The produced data may include a k-anonymity property if the privacy-specific data provided in the produced data cannot be distinguished from at least k−1 individuals whose information also appear in the produced data.

The sensitivity parameter may include a sensitivity value associated with a differential privacy model to be applied to the knowledge graph. The differential privacy model may publicly share information about a dataset by describing patterns of groups within the dataset (e.g., a distribution of data) while withholding information about individuals in the dataset. A model may be referred to as a differential privacy model if an observer seeing output of the model cannot tell if a particular individual's information was used to compute the output. In one example, the sensitivity parameter may include a value of one when changing any entry in a dataset causes an output of the differential privacy model to change by either zero or one.

The noise multiplier parameter may include a noise multiplier distribution associated with the differential privacy model. Adding controlled noise from predetermined distributions is a way of designing differentially private datasets and is useful for designing private mechanisms for real-valued functions on sensitive data. The noise multiplier parameter may include a Laplace mechanism, a Gaussian mechanism, and/or the like. The Laplace mechanism may add noise drawn from a Laplace distribution, while the Gaussian mechanism may add noise drawn from a Gaussian distribution.

The acceptance value may include a threshold epsilon ($\varepsilon$)-differential privacy score associated with the differential privacy model. The acceptance value may include a mathematical definition for privacy loss associated with a dataset. The acceptance value may ensure that an individual's privacy cannot be compromised by a dataset release if data associated with the individual is not in the dataset. The acceptance value may provide each individual approximately a same privacy that would result from having the data associated with the individual removed. This may ensure that statistical functions executed on the dataset do not overly depend on the data of any one individual.

As further shown in FIG. 1A, and by reference number 110, the anonymization system may process the knowledge graph, with a quasi-identifier relation model, to select triples in the knowledge graph. Quasi-identifiers are pieces of information that are not of themselves unique identifiers but are sufficiently well-correlated with an entity that they can be combined with other quasi-identifiers to create a unique identifier. Quasi-identifiers can thus, when combined, become personally identifying information. In some implementations, the quasi-identifier relation model selects triples in the knowledge graph that include quasi-identifier relations. For example, the quasi-identifier relation model may select sets of triples in the knowledge graph, such as ["patient 1101," "has age," "90"], ["patient 1101," "has height," "6.0"], ["patient 1101," "has nationality," "Irish"], ["patient 1," "has age," "80"], ["patient 1," "has gender," "male"], ["patient 10," "has age," "34"], ["patient 9994," "has gender," "male"], ["patient 9998," "has age," "55"], ["patient 9998," "has gender," "female"], and/or the like.

Figure 1B:
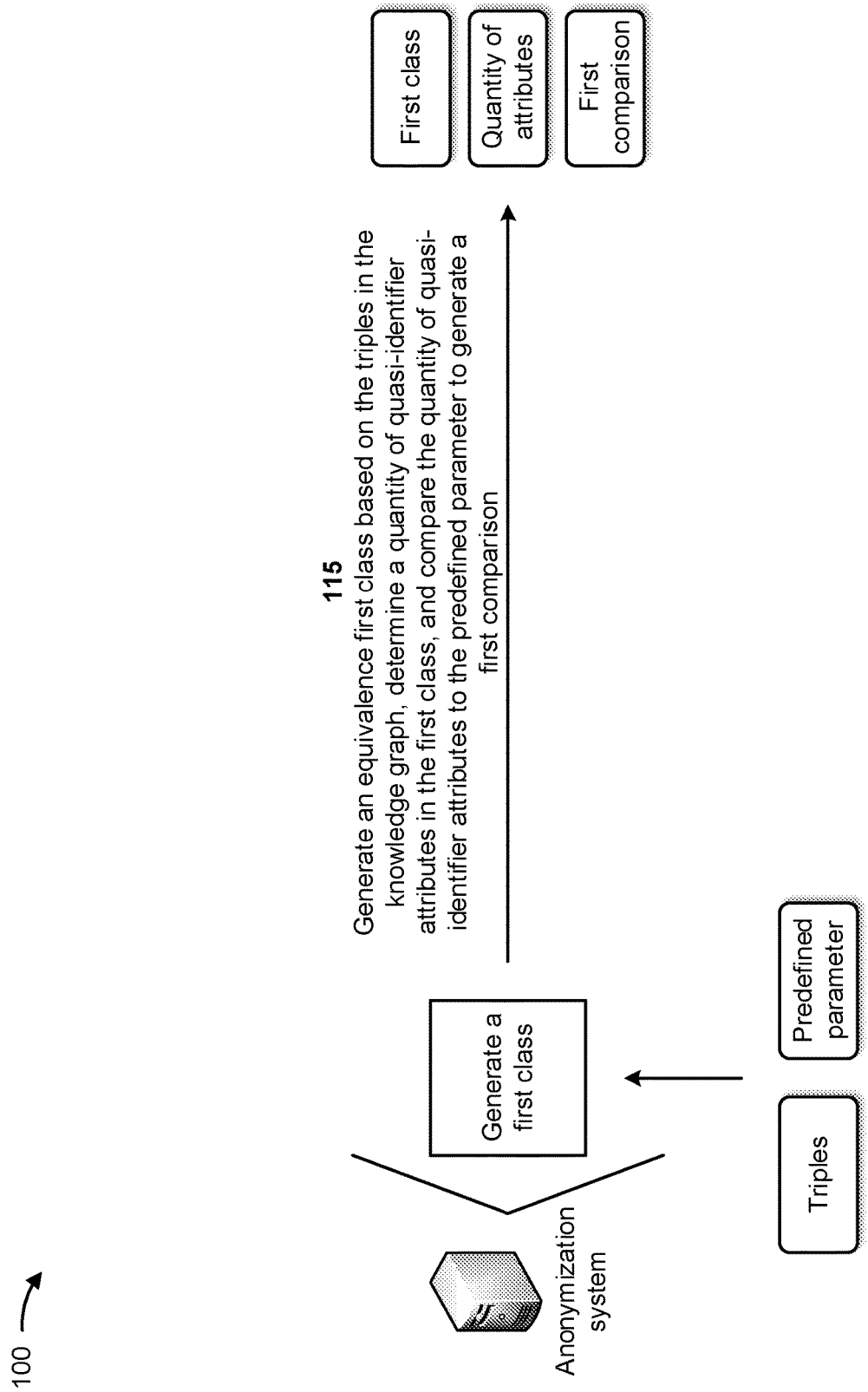

As shown in FIG. 1B, and by reference number 115, the anonymization system may generate an equivalence first class based on the triples in the knowledge graph. For example, the anonymization system may map the quasi-identifier attributes connected to each personal entity by the quasi-identifier relations in the knowledge graph (e.g., the triples in the knowledge graph), and may determine equivalence classes based on the mapping (e.g., the equivalence first class). For example, if the knowledge graph includes ages and genders of individuals, the equivalence first class may include groups based on the ages and the genders (e.g., "80 year old males," "34 year old males," "46 year old males," "54 year old females," and/or the like).

As further shown in FIG. 1B, and by reference number 115, the anonymization system may determine a quantity of quasi-identifier attributes in the first class. For example, the anonymization system may determine sizes of the equivalence classes. In other words, the anonymization system may determine quantities of individuals in the groups. For example, for the groups based on the ages and the genders, the anonymization system may determine that there are "222" "80 year old males," that there are "250" "34 year old males," that there are "253" "46 year old males," that there are "188" "54 year old females," and/or the like in the knowledge graph.

As further shown in FIG. 1B, and by reference number 115, the anonymization system may compare the quantity of quasi-identifier attributes to the predefined parameter to generate a first comparison. For example, the anonymization system may compare the quantities of individuals in the groups (e.g., the quantity of quasi-identifier attributes) to the k-anonymity value (e.g., the predefined parameter) to generate the first comparison. If none of the quantities of individuals in the groups are greater than the k-anonymity value, the anonymization system may determine that k-anonymity is achieved for the k-anonymity value. If one or more of the quantities of individuals in corresponding one or more groups are greater than or equal to the k-anonymity value, the anonymization system may determine that k-anonymity is not achieved for the k-anonymity value (e.g., for the corresponding one or more groups).

Figure 1C:
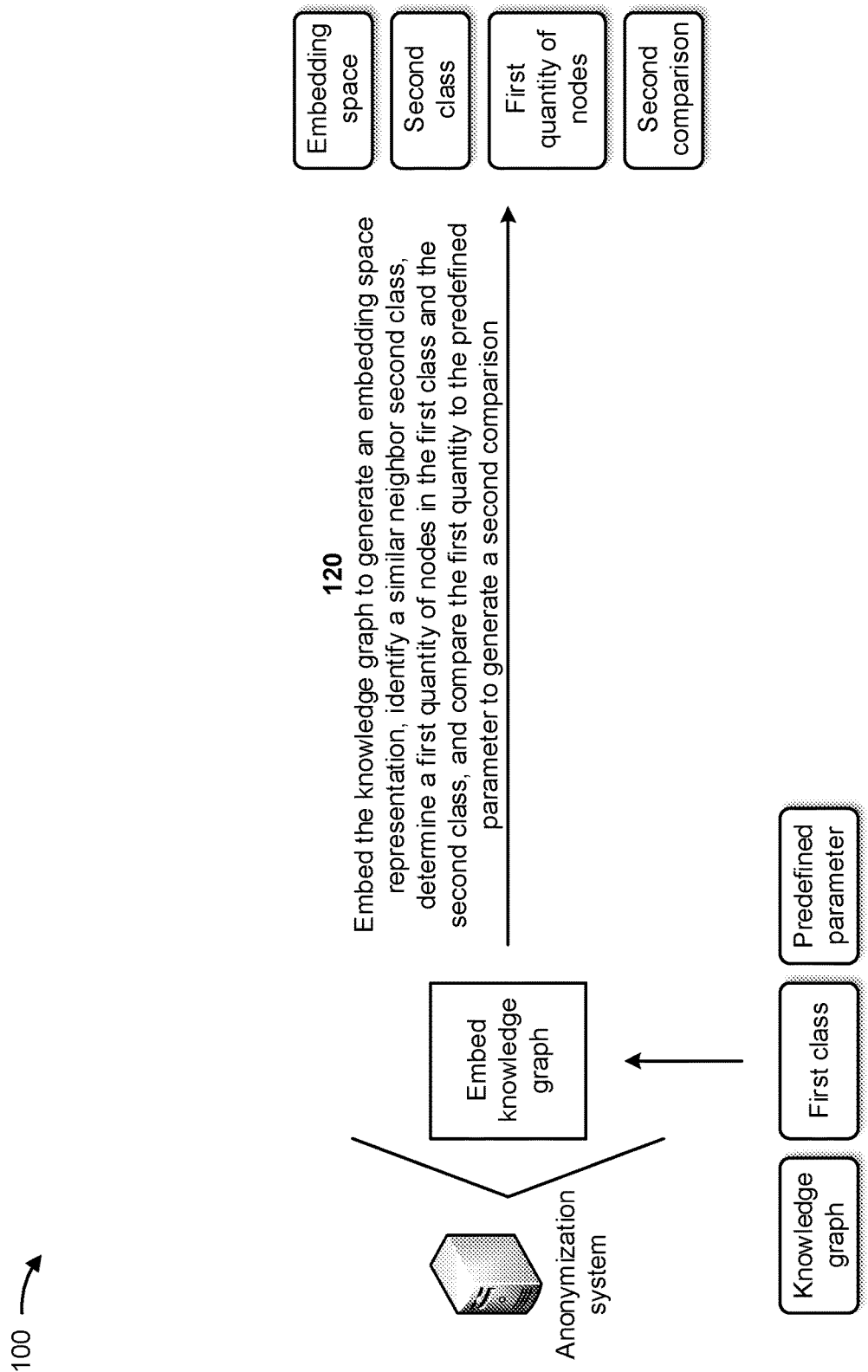

As shown in FIG. 1C, and by reference number 120, the anonymization system may embed the knowledge graph to generate an embedding space representation. For example, the anonymization system may process the triples of the knowledge graph, with a knowledge graph embedding model, to generate the embedding space representation (e.g., a latent space graph). The embedding space representation may represent entities and relations in the knowledge graph as elements in a continuous vector space, and the embedding space representation may provide a generalizable context about the knowledge graph that can be used to infer relations. In some implementations, the knowledge graph embedding model may include a translation based embedding model (e.g., TransE), a hyperplane translation based embedding model (e.g., TransH), a relationship space based embedding model (e.g., TransR), a Rescal model, a DistMult model, and/or the like.

As further shown in FIG. 1C, and by reference number 120, the anonymization system may identify a similar neighbor second class. In some implementations, for each equivalence class, the anonymization system may determine a nearest equivalence class (e.g., the similar neighbor second class). For example, for the groups based on the ages and the genders, the anonymization system may determine that the "80 year old males" group provided in the first class is nearest to a group of "75 year old males" (e.g., the similar neighbor second class), may determine that "54 year old females" group provided in the first class is nearest to a group of "52 year old females" (e.g., the similar neighbor second class), and/or the like.

As further shown in FIG. 1C, and by reference number 120, the anonymization system determines a first quantity of nodes in the first class and the second class. For example, the anonymization system may determine the quantity of nodes in the first class based on the sizes of the equivalence classes (e.g., the quantities of individuals in the groups). For example, for the groups based on the ages and the genders, the anonymization system may determine that there are "222" "80 year old males," that there are "250" "34 year old males," that there are "253" "46 year old males," that there are "188" "54 year old females," and/or the like. The anonymization system may determine the quantity of nodes in the second class based on sizes of the similar neighbor classes (e.g., the quantities of individuals). For example, for the groups based on the ages and the genders, the anonymization system may determine that there are "101" "75 year old males," that there are "97" "52 year old females," and/or the like.

As further shown in FIG. 1C, and by reference number 120, the anonymization system may compare the first quantity to the predefined parameter to generate a second comparison. For example, the anonymization system may compare the quantities of individuals in the first class and the second class to the k-anonymity value (e.g., the predefined parameter) to generate the second comparison.

Figure 1D:
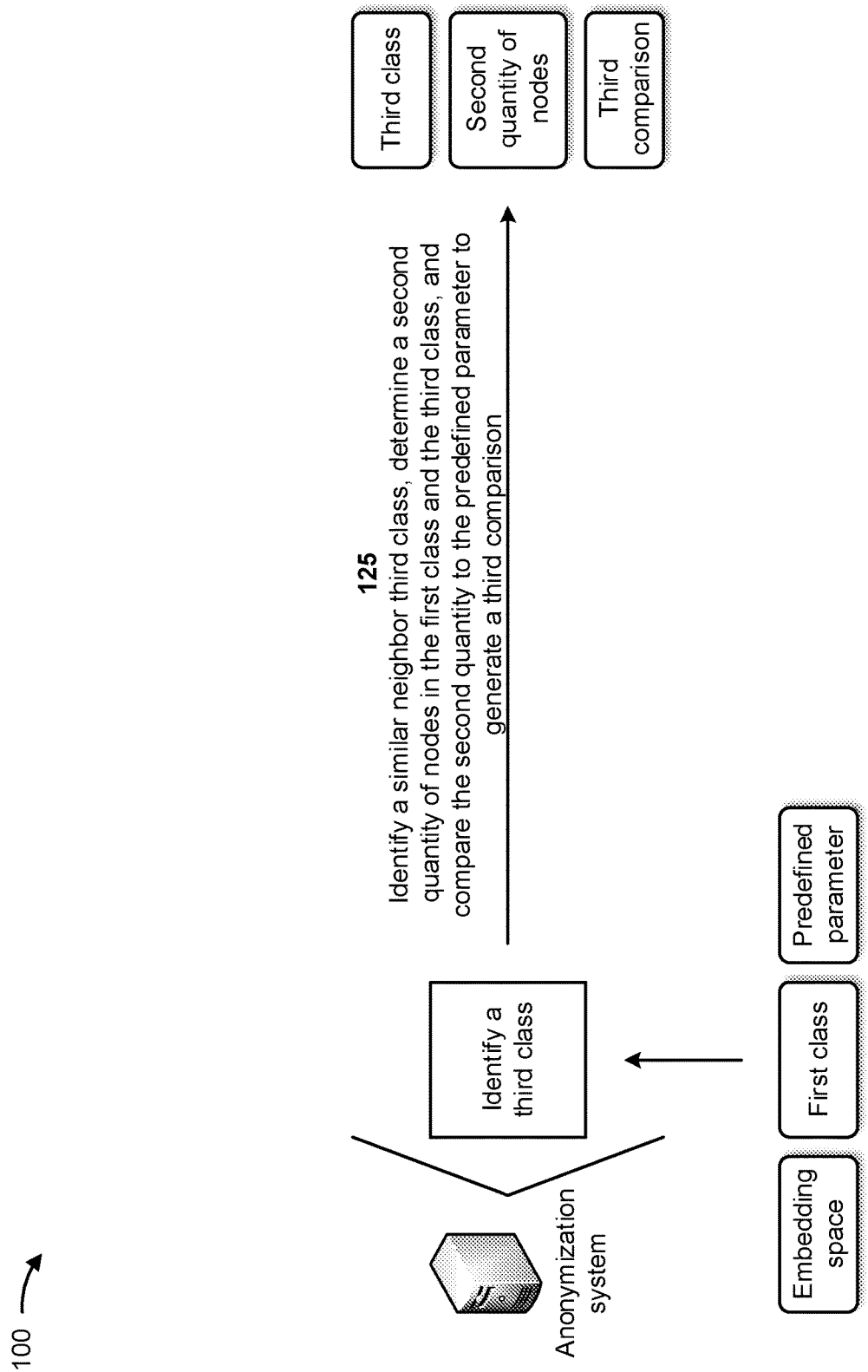

As shown in FIG. 1D, and by reference number 125, the anonymization system may identify a similar neighbor third class. In some implementations, for each individual in each equivalence class, the anonymization system may determine a nearest non-group individual (e.g., the similar neighbor third class) in the embedding space representation. For example, for the groups based on the ages and the genders, the anonymization system may determine that ["person 15664," "50," "male"] provided in the first class is nearest to ["person 16403," "57," "male"] of the third class; that ["person 17327," "50," "male"] provided in the first class is nearest to ["person 20806," "54," "male"] of the third class; that ["person 17368," "50," "male"] provided in the first class is nearest to ["person 18633," "36," "male"] of the third class; and/or the like.

As further shown in FIG. 1D, and by reference number 125, the anonymization system may determine a second quantity of nodes in the first class and the third class. For example, the anonymization system may determine the quantity of nodes in the first class based on the sizes of the equivalence classes (e.g., the quantities of individuals in the groups). For example, for the groups based on the ages and the genders, the anonymization system may determine that there are "222" "80 year old males," that there are "250" "34 year old males," that there are "253" "46 year old males," that there are "188" "54 year old females," and/or the like. The anonymization system may determine the quantity of nodes in the third class based on sizes of the similar neighbor classes (e.g., the quantities of individuals). For example, for the groups based on the ages and the genders, the anonymization system may determine that there are "30" "57 year old males" (e.g., similar to person 16403), that there are "39" "54 year old males" (e.g., similar to person 20806), that there are "55" "36 year old males" (e.g., similar to person 18633), and/or the like.

As further shown in FIG. 1D, and by reference number 125, the anonymization system may compare the second quantity to the predefined parameter to generate a third comparison. For example, the anonymization system may compare the quantities of individuals in the first class and the third class to the k-anonymity value (e.g., the predefined parameter) to generate the third comparison.

Figure 1E:
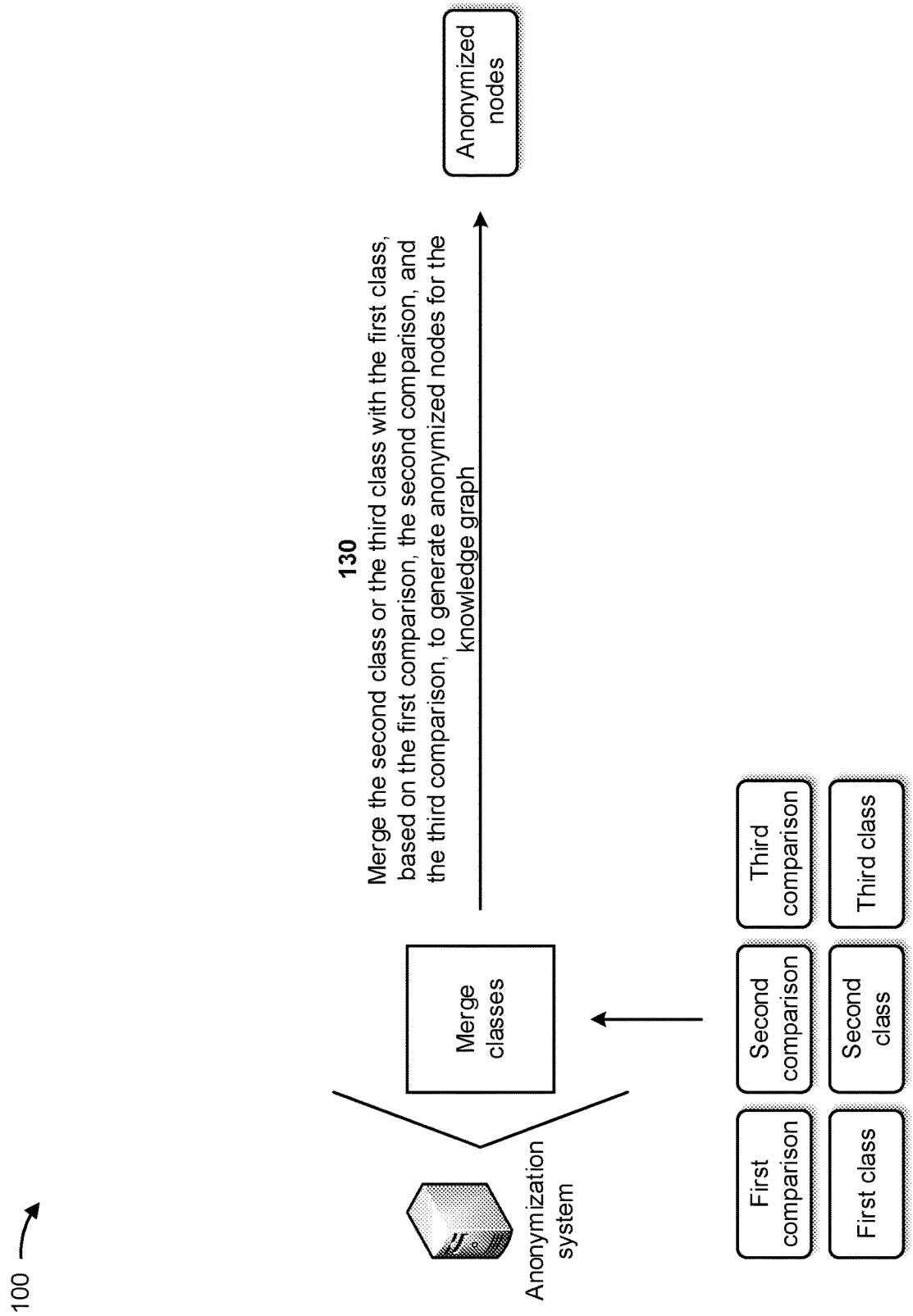

As shown in FIG. 1E, and by reference number 130, the anonymization system may merge the second class or the third class with the first class, based on the first comparison, the second comparison, and the third comparison, to generate anonymized nodes for the knowledge graph. For example, the anonymization system may merge the second class with the first class, based on the first comparison, the second comparison, and the third comparison, to generate a first set of anonymized nodes for the knowledge graph. The anonymization system may merge the third class with the first class, based on the first comparison, the second comparison, and the third comparison, to generate a second set of anonymized nodes for the knowledge graph. The anonymization system may combine the first set of anonymized nodes and the second set of anonymized nodes to generate an anonymized knowledge graph.

In some implementations, the anonymization system may determine whether to merge the second class or the third class with the first class by determining a first size associated with combining the second class with the first class and determining a second size associated with combining the third class with the first class. If the first size is minimized above the predefined parameter (e.g., the k-anonymity value), then the anonymization system may merge the second class with the first class. If the second size is minimized above the predefined parameter (e.g., the k-anonymity value), then the anonymization system may merge the third class with the first class. If neither the first size nor the second size is minimized above the predefined parameter, but the first size is larger than the second size, then the anonymization system may merge the second class with the first class. If neither the first size nor the second size is minimized above the predefined parameter, but the second size is larger than the first size, then the anonymization system may merge the third class with the first class. If neither the first size nor the second size is minimized above the predefined parameter, and the first size is equivalent to the second size, then the anonymization system may randomly select the second class or the third class to merge with the first class.

Figure 1F:
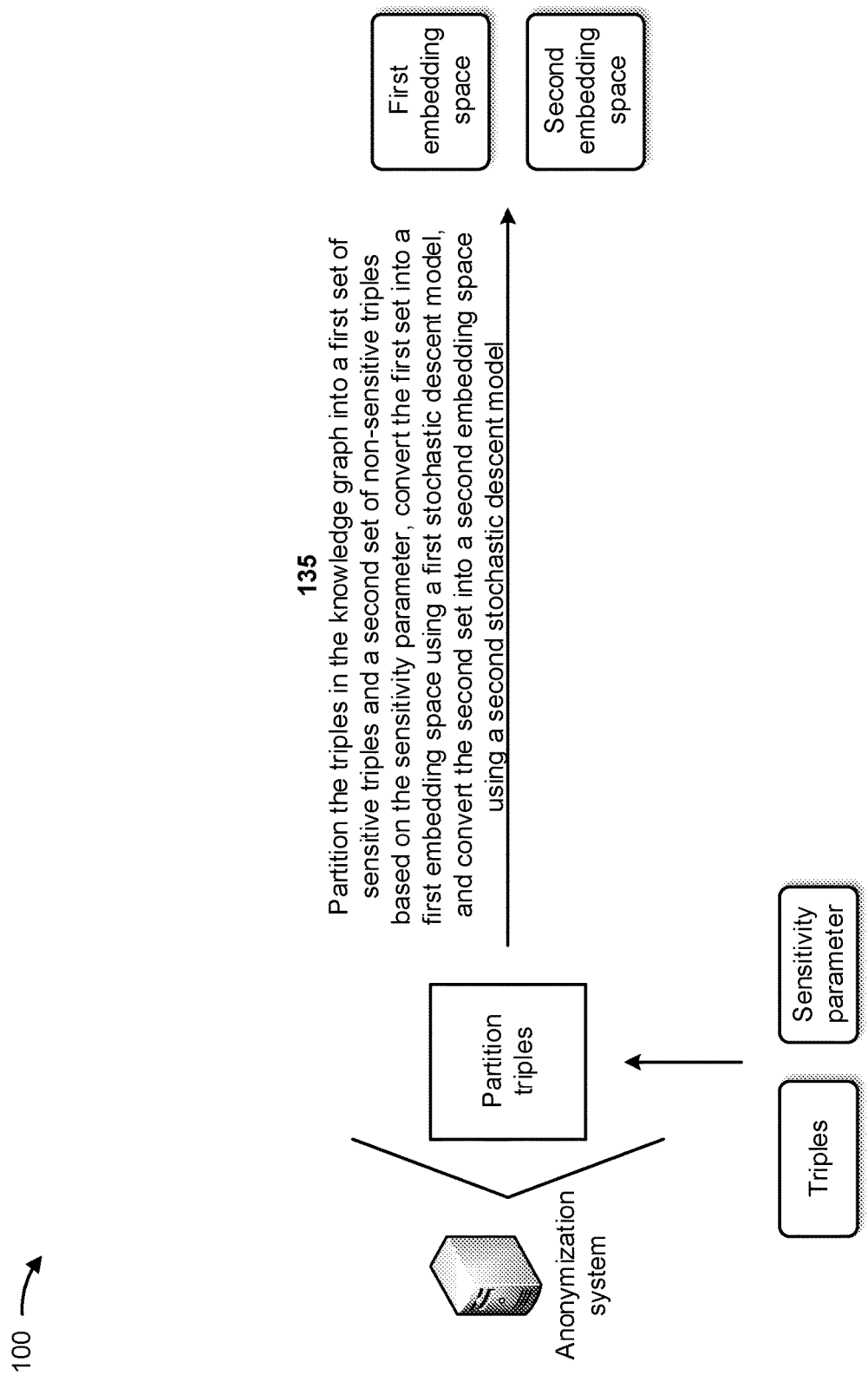

As shown in FIG. 1F, and by reference number 135, the anonymization system may partition the triples in the knowledge graph into a first set of sensitive triples and a second set of non-sensitive triples based on the sensitivity parameter. For example, the sensitivity parameter may include a parameter that ensures that sensitive data (e.g., personal identifiers, ages, genders, nationalities, and/or the like) of the knowledge graph is maintained in privacy. The anonymization system may analyze the triples in the knowledge graph and may identify triples that include sensitive data (e.g., satisfy the sensitivity parameter). The anonymization system may group the triples that include the sensitive data into the first set of sensitive triples. The anonymization system may identify triples that fail to include sensitive data (e.g., fail to satisfy the sensitivity parameter) and may group the triples that fail to include the sensitive data into the second set of non-sensitive triples.

As further shown in FIG. 1F, and by reference number 135, the anonymization system may convert the first set into a first embedding space using a first stochastic descent model. For example, the anonymization system may process the first set of sensitive triples, with a stochastic gradient descent model, to convert the first set of sensitive triples into the first embedding space. The first embedding space may include a stochastic approximation of gradient descent optimization, since the first embedding space replaces an actual gradient (e.g., calculated from the entire first set of sensitive triples) with an estimated gradient (e.g., calculated from a randomly selected subset of the first set of sensitive triples).

As further shown in FIG. 1F, and by reference number 135, the anonymization system may convert the second set into a second embedding space using a second stochastic descent model. For example, the anonymization system may process the second set of non-sensitive triples, with a stochastic gradient descent model, to convert the second set of non-sensitive triples into the second embedding space. The second embedding space may include a stochastic approximation of gradient descent optimization, since the second embedding space replaces an actual gradient (e.g., calculated from the entire second set of non-sensitive triples) with an estimated gradient (e.g., calculated from a randomly selected subset of the second set of non-sensitive triples).

Figure 1G:
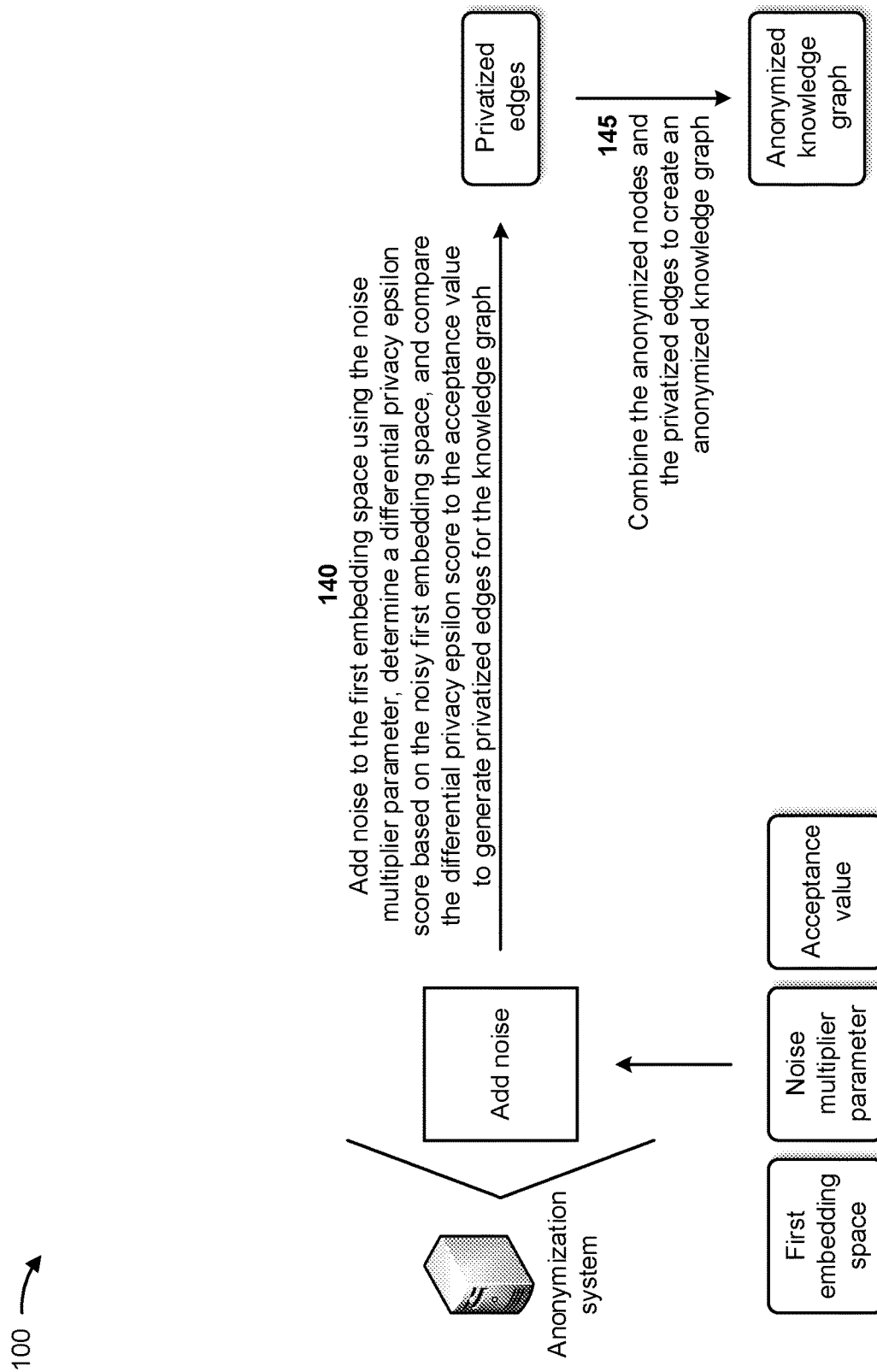

As shown in FIG. 1G, and by reference number 140, the anonymization system may add noise to the first embedding space using the noise multiplier parameter. For example, the anonymization system may add parameterized Gaussian noise to the first embedding space. In some implementations, the anonymization system adds enough noise to the first embedding space to hide data in the first embedding space and to generate a noisy first embedding space.

In some implementations, the anonymization system may utilize a clip value parameter to bound the first embedding space, prior to adding the noise to the first embedding space. For example, the first embedding space (e.g., gradients) may be represented as:

$$\tilde{g} \leftarrow \frac{1}{b}(\sum_i \bar{g}(x_i) + \aleph(0, \sigma^2 C^2 I)),$$

where b corresponds to a batch size, σ·C corresponds to a standard deviation of the Gaussian noise mechanism, and C corresponds to a threshold that controls clipping of each gradient. The gradient of a sample $(x_i)$ may be defined as:

$$g(x_i) \leftarrow \nabla_\theta L(\theta, x_i),$$

where L corresponds to a loss function, and ∇ and θ correspond to parameters in a model to be optimized. A clipped gradient of a sample $(x_i)$ may be defined as:

$$g(x_i) \leftarrow g(x_i)/\max\left(1, \frac{\|g(x_i)\|_2}{C}\right),$$

where $\|x_i\|_2$ corresponds to an $L_2$ norm of $g(x_i)$.

As further shown in FIG. 1G, and by reference number 140, the anonymization system may determine a differential privacy epsilon score based on the noisy first embedding space. The differential privacy epsilon score enables the anonymization system to balance privacy and accuracy levels with a positive value named epsilon (ε). If epsilon is small, then more privacy is preserved, but data accuracy is worse. If epsilon is large, privacy is worse, but data accuracy is preserved. Epsilon may include a value from zero to infinity. In some implementations, the anonymization system processes the noisy first embedding space, with an epsilon differential privacy model, to determine the differential privacy epsilon score.

As further shown in FIG. 1G, and by reference number 140, the anonymization system may compare the differential privacy epsilon score to the acceptance value to generate privatized edges for the knowledge graph. For example, if the anonymization system determines that the differential privacy epsilon score satisfies the acceptance value (e.g., satisfies a privacy requirement for the knowledge graph), the anonymization system may generate privatized edges for the knowledge graph based on the differential privacy epsilon score. If the anonymization system determines that the differential privacy epsilon score fails to satisfy the acceptance value (e.g., fails to satisfy the privacy requirement for the knowledge graph), the anonymization system may modify the epsilon value and recalculate the differential privacy epsilon score until the differential privacy epsilon score satisfies the acceptance value.

As further shown in FIG. 1G, and by reference number 145, the anonymization system may combine the anonymized nodes and the privatized edges to create an anonymized knowledge graph. For example, the anonymization system may combine the anonymized nodes, described above in connection with FIG. 1E, with the privatized edges to create the anonymized knowledge graph. In some implementations, the anonymization system provides the knowledge graph, with the anonymized nodes, for display to the client device, or provides the anonymized knowledge graph for display to the client device. In this way, the client device may utilize the anonymized knowledge graph without disclosing private information.

In some implementations, the anonymization system utilizes the knowledge graph, with the anonymized nodes, to perform a calculation that satisfies one or more privacy conditions or utilizes the anonymized knowledge graph to perform the calculation that satisfies the one or more privacy conditions. In this way, the anonymization system may utilize the anonymized knowledge graph without disclosing private information.

In some implementations, the anonymization system utilizes the knowledge graph, with the anonymized nodes, or the anonymized knowledge graph to determine new knowledge associated with a subject matter of the knowledge graph, and provides data identifying the new knowledge for display to the client device. In this way, the anonymization system may utilize the anonymized knowledge to determine new knowledge and without disclosing private information.

In some implementations, the anonymization system provides the knowledge graph, with the anonymized nodes, or the anonymized knowledge graph for display to the client device, and receives, from the client device, feedback associated with the knowledge graph. The feedback may indicate that privacy is not preserved by the anonymized knowledge graph. The anonymization system may increase a value associated with the predefined parameter, based on the feedback, to increase an anonymization associated with the anonymized nodes for the knowledge graph.

In this way, the anonymization system may apply a k-anonymity model to protect node level privacy in knowledge graphs and a differential privacy model to protect edge level privacy in knowledge graphs. For example, the anonymization system may utilize a k-anonymization model that leverages a knowledge graph embedding as an approximate means to maximize data utility during a data privatization phase. The anonymization system may incorporate a differential privacy mechanism to provide privacy for sensitive attributes contained in the knowledge graph, and the anonymization system may aid an end user in understanding trade-offs in privacy and utility. Thus, the anonymization system conserves human resources, computing resources, networking resources, and/or the like that would otherwise have been wasted by violating data privacy legal compliance requirements during utilization of knowledge graphs, unsuccessfully attempting to identify privacy data associated with knowledge graphs, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
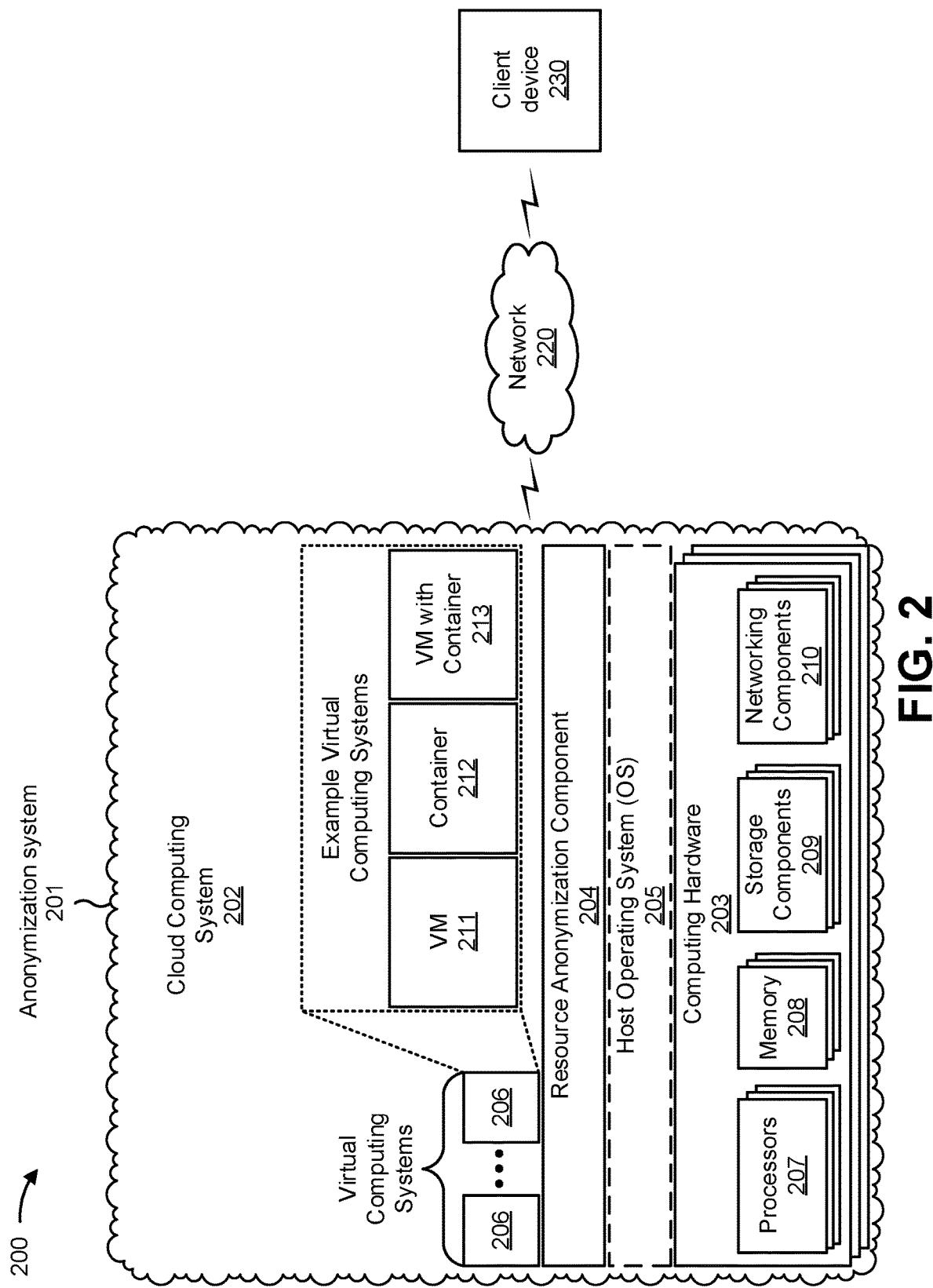
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an anonymization system 201, which may include one or more elements of and/or may execute within a cloud computing system 202. The cloud computing system 202 may include one or more elements 203-213, as described in more detail below. As further shown in FIG. 2, environment 200 may include a network 220 and/or a client device 230. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the anonymization system 201 may include one or more elements 203-213 of the cloud computing system 202, may execute within the cloud computing system 202, and/or may be hosted within the cloud computing system 202, in some implementations, the anonymization system 201 may not be cloud-based (e.g., may be implemented outside of a cloud computing system) or may be partially cloud-based. For example, the anonymization system 201 may include one or more devices that are not part of the cloud computing system 202, such as device 300 of FIG. 3, which may include a standalone server or another type of computing device. The anonymization system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

Client device 230 includes one or more devices capable of receiving, generating, storing, processing, and/or providing information associated with a knowledge graph, as described elsewhere herein. Client device 230 may include a communication device and/or a computing device. For example, client device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
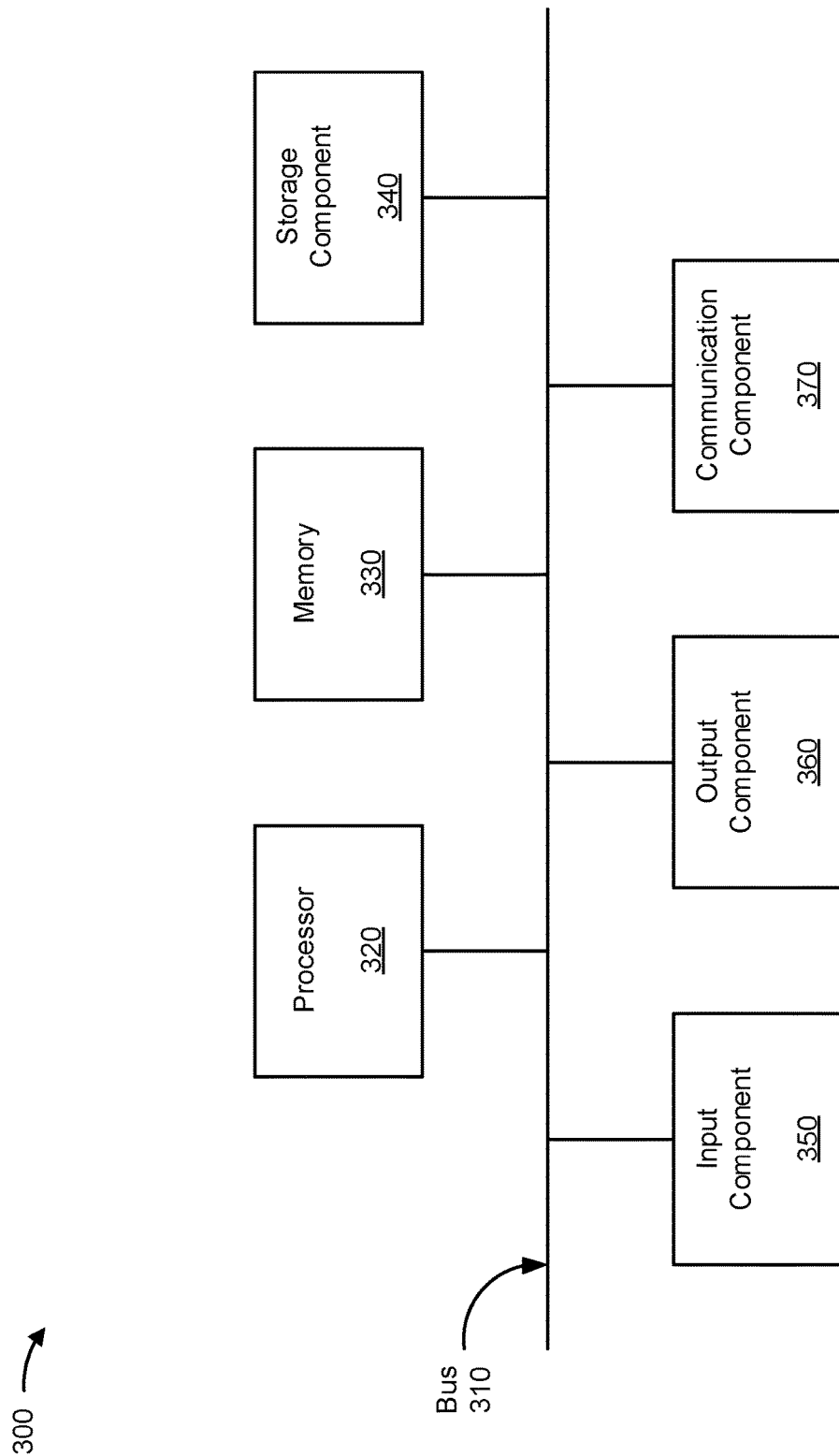
FIG. 3 is a diagram of example components of one or more devices of FIG. 2.

FIG. 3 is a diagram of example components of a device 300, which may correspond to anonymization system 201 and/or client device 230. In some implementations, anonymization system 201 and/or client device 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
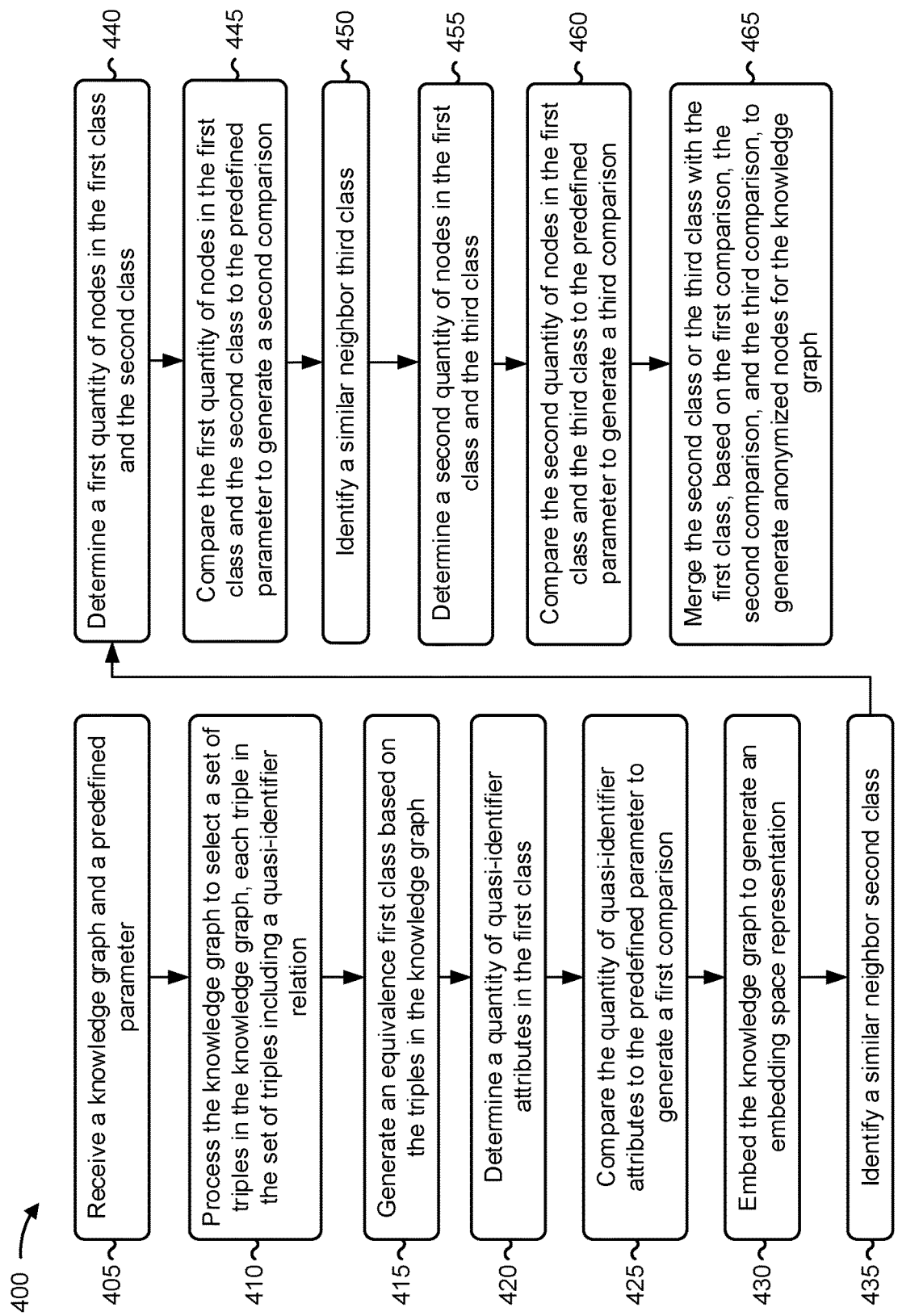
FIG. 4 is a flowchart of an example process for applying a k-anonymity model to protect node level privacy in knowledge graphs and a differential privacy model to protect edge level privacy in knowledge graphs.

FIG. 4 is a flowchart of an example process 400 for applying a k-anonymity model to protect node level privacy in knowledge graphs and a differential privacy model to protect edge level privacy in knowledge graphs. In some implementations, one or more process blocks of FIG. 4 may be performed by a device (e.g., anonymization system 201). In some implementations, one or more process blocks of FIG. 4 may be performed by another device or a group of devices separate from or including the device, such as a client device (e.g., client device 230). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving a knowledge graph and a predefined parameter (block 405). For example, the device may receive a knowledge graph and a predefined parameter, as described above.

As further shown in FIG. 4, process 400 may include processing the knowledge graph to select a set of triples in the knowledge graph, each triple in the set of triples including a quasi-identifier relation (block 410). For example, the device may process the knowledge graph to select a set of triples in the knowledge graph, each triple in the set of triples including a quasi-identifier relation, as described above.

As further shown in FIG. 4, process 400 may include generating an equivalence first class based on the set of triples in the knowledge graph (block 415). For example, the device may generate an equivalence first class based on the set of triples in the knowledge graph, as described above.

As further shown in FIG. 4, process 400 may include determining a quantity of quasi-identifier attributes in the first class (block 420). For example, the device may determine a quantity of quasi-identifier attributes in the first class, as described above.

As further shown in FIG. 4, process 400 may include comparing the quantity of quasi-identifier attributes to the predefined parameter to generate a first comparison (block 425). For example, the device may compare the quantity of quasi-identifier attributes to the predefined parameter to generate a first comparison, as described above.

As further shown in FIG. 4, process 400 may include embedding the knowledge graph to generate an embedding space representation (block 430). For example, the device may embed the knowledge graph to generate an embedding space representation, as described above.

As further shown in FIG. 4, process 400 may include identifying a similar neighbor second class (block 435). For example, the device may identify a similar neighbor second class, as described above.

As further shown in FIG. 4, process 400 may include determining a first quantity of nodes in the first class and the second class (block 440). For example, the device may determine a first quantity of nodes in the first class and the second class, as described above.

As further shown in FIG. 4, process 400 may include comparing the first quantity of nodes in the first class and the second class to the predefined parameter to generate a second comparison (block 445). For example, the device may compare the first quantity of nodes in the first class and the second class to the predefined parameter to generate a second comparison, as described above.

As further shown in FIG. 4, process 400 may include identifying a similar neighbor third class (block 450). For example, the device may identify a similar neighbor third class, as described above.

As further shown in FIG. 4, process 400 may include determining a second quantity of nodes in the first class and the third class (block 455). For example, the device may determine a second quantity of nodes in the first class and the third class, as described above.

As further shown in FIG. 4, process 400 may include comparing the second quantity of nodes in the first class and the third class to the predefined parameter to generate a third comparison (block 460). For example, the device may compare the second quantity of nodes in the first class and the third class to the predefined parameter to generate a third comparison, as described above.

As further shown in FIG. 4, process 400 may include merging the second class or the third class with the first class, based on the first comparison, the second comparison, and the third comparison, to generate anonymized nodes for the knowledge graph (block 465). For example, the device may merge the second class or the third class with the first class, based on the first comparison, the second comparison, and the third comparison, to generate anonymized nodes for the knowledge graph, as described above.

Process 400 may include additional implementations, such as any single implementation or any combination of implementations described below and/or in connection with one or more other processes described elsewhere herein.

In a first implementation, process 400 includes providing the knowledge graph, with the anonymized nodes, for display, or utilizing the knowledge graph, with the anonymized nodes, to perform a calculation that satisfies one or more privacy conditions.

In a second implementation, alone or in combination with the first implementation, process 400 includes generating privatized edges for the knowledge graph based on a differential privacy model and combining the anonymized nodes and the privatized edges to create an anonymized knowledge graph.

In a third implementation, alone or in combination with one or more of the first and second implementations, process 400 includes providing the anonymized knowledge graph for display or utilizing the anonymized knowledge graph to perform a calculation that satisfies one or more privacy conditions.

In a fourth implementation, alone or in combination with one or more of the first through third implementations, the predefined parameter includes an anonymization value.

In a fifth implementation, alone or in combination with one or more of the first through fourth implementations, when the first quantity of nodes or the second quantity of nodes is greater than the predefined parameter, anonymity is achieved for the predefined parameter.

In a sixth implementation, alone or in combination with one or more of the first through fifth implementations, embedding the knowledge graph to generate the embedding space representation comprises processing the set of triples in the knowledge graph, with a knowledge graph embedding model, to generate the embedding space representation.

In a seventh implementation, alone or in combination with one or more of the first through sixth implementations, the embedding space representation is a latent space graph.

In an eighth implementation, alone or in combination with one or more of the first through seventh implementations, merging the second class or the third class with the first class, based on the first comparison, the second comparison, and the third comparison, to generate the anonymized nodes for the knowledge graph includes merging the second class with the first class, based on the first comparison, the second comparison, and the third comparison, to generate a first set of anonymized nodes for the knowledge graph; merging the third class with the first class, based on the first comparison, the second comparison, and the third comparison, to generate a second set of anonymized nodes for the knowledge graph; and combining the first set of anonymized nodes and the second set of anonymized nodes to generate an anonymized knowledge graph.

In a ninth implementation, alone or in combination with one or more of the first through eighth implementations, the anonymized nodes prevent identification of one or more of personal identifiers, the quasi-identifier attributes, insensitive attributes, or quasi-identifier predicates.

In a tenth implementation, alone or in combination with one or more of the first through ninth implementations, process 400 includes utilizing the knowledge graph, with the anonymized nodes, to determine new knowledge associated with a subject matter of the knowledge graph, and providing data identifying the new knowledge for display.

In an eleventh implementation, alone or in combination with one or more of the first through tenth implementations, process 400 includes increasing a value associated with the predefined parameter to increase an anonymization associated with the anonymized nodes for the knowledge graph.

In a twelfth implementation, alone or in combination with one or more of the first through eleventh implementations, process 400 includes providing the knowledge graph, with the anonymized nodes, for display to a client device; receiving, from the client device, feedback associated with the knowledge graph; and increasing a value associated with the predefined parameter, based on the feedback, to increase an anonymization associated with the anonymized nodes for the knowledge graph.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, a knowledge graph, a predefined parameter, a sensitivity parameter, a noise multiplier parameter, and an acceptance value;
selecting, by the device, a set of triples in the knowledge graph, by processing the knowledge graph, each triple in the set of triples including a quasi-identifier relation;
generating, by the device, an equivalence first class based on the set of triples in the knowledge graph;
determining, by the device, a quantity of a plurality of quasi-identifier attributes in the first class;
generating, by the device, a first comparison, by comparing the quantity of the plurality of quasi-identifier attributes to the predefined parameter;
generating, by the device, an embedding space generation representation, by processing the set of triples of the knowledge graph with a knowledge graph embedding model;
identifying, by the device, a similar neighbor second class for the equivalence first class;
determining, by the device, a first quantity of nodes in the first class and the second class;
generating, by the device, a second comparison, by comparing the first quantity of nodes in the first class and the second class to the predefined parameter;
identifying, by the device, a similar neighbor third class by determining nearest nongroup in the embedding space generation representation;
determining, by the device, a second quantity of nodes in the first class and the third class;
generating, by the device, a third comparison, by comparing the second quantity of nodes in the first class and the third class to the predefined parameter; and
generating anonymized nodes for the knowledge graph, by the device, by merging the second class or the third class with the first class, based on the first comparison, the second comparison, and the third comparison,
wherein merging further comprises:
based on the second comparison, merge the second class with the first class, if the first quantity of nodes is minimized above the predefined parameter;
based on the third comparison, merge the third class with the first class, if the second quantity is minimized above the predefined parameter;
generating privatized edges for the knowledge graph based on a differential privacy model, wherein generating the privatized edges for the knowledge graph further comprises:
generating, by analyzing the set of triples in the knowledge graph and based on the sensitivity parameter, a first set of sensitive triples and a second set of non-sensitive triples, wherein the sensitivity parameter comprises a sensitivity value associated with the differential privacy model to be applied to the knowledge graph;
converting, by processing the first set of sensitive triples using a first stochastic descent model, the first set of sensitive triples into a first embedding space;
converting, by processing the second set of non-sensitive triples using a second stochastic descent model, the second set of non-sensitive triples into a second embedding space;
generating a noisy first embedding space by adding parameterized Gaussian noise using the noise multiplier parameter to the first embedding space;
determining, by processing the noisy first embedding space with the differential privacy model, a differential privacy epsilon score; and
determining, by comparing the differential privacy epsilon score to the acceptance value, the differential privacy epsilon score satisfies a privacy requirement for the knowledge graph to generate the privatized edges for the knowledge graph; and
generating, by combining the anonymized nodes and the privatized edges, an anonymized knowledge graph to provide data identifying new knowledge associated with a subject matter of the knowledge graph.

2. The method of claim 1, further comprising one or more of:
providing the anonymized knowledge graph for display; or
utilizing the anonymized knowledge graph to perform a calculation that satisfies one or more privacy conditions.

3. The method of claim 1, wherein the predefined parameter includes an anonymization value.

4. The method of claim 1, wherein when the first quantity of nodes or the second quantity of nodes is greater than the predefined parameter, anonymity is achieved for the predefined parameter.

5. A device, comprising:
one or more memories; and
one or more processors, communicatively coupled to the one or more memories, configured to:
receive a knowledge graph, a predefined parameter, a sensitivity parameter, a noise multiplier parameter, and an acceptance value;
select a set of triples in the knowledge graph, by processing the knowledge graph, each triple in the set of triples including a quasi-identifier relation;
generate an equivalence first class based on the set of triples in the knowledge graph;
determine a quantity of quasi-identifier attributes in the first class;
generate a first comparison, by comparing the quantity of quasi-identifier attributes to the predefined parameter;
generate an embedding space representation, by processing the set of triples of the knowledge graph with a knowledge graph embedding model;
identify a similar neighbor second class for the equivalence class;
determine a first quantity of nodes in the first class and the second class;
generate a second comparison, by comparing the first quantity of nodes in the first class and the second class to the predefined parameter;
identify a similar neighbor third class;
determine a second quantity of nodes in the first class and the third class;
generate a third comparison, by comparing the second quantity of nodes in the first class and the third class to the predefined parameter to generate the third comparison;
generate anonymized nodes for the knowledge graph, by merging the second class or the third class with the first class, based on the first comparison, the second comparison, and the third comparison,
wherein merging further comprises:
based on the second comparison, merge the second class with the first class, if the first quantity of nodes is minimized above the predefined parameter;

based on the third comparison, merge the third class with the first class, if the second quantity is minimized above the predefined parameter;
generate privatized edges for the knowledge graph based on a differential privacy model, wherein generating the privatized edges for the knowledge graph further comprises:
generating, by analyzing the set of triples in the knowledge graph and based on the sensitivity parameter, a first set of sensitive triples and a second set of non-sensitive triples, wherein the sensitivity parameter comprises a sensitivity value associated with the differential privacy model to be applied to the knowledge graph;
converting, by processing the first set of sensitive triples using a first stochastic descent model, the first set of sensitive triples into a first embedding space;
converting, by processing the second set of non-sensitive triples using a second stochastic descent model, the second set of non-sensitive triples into a second embedding space;
generating a noisy first embedding space, by adding parameterized Gaussian noise using the noise multiplier parameter to the first embedding space;
determining, by processing the noisy first embedding space with the differential privacy model, a differential privacy epsilon score; and
determining, by comparing the differential privacy epsilon score to the acceptance value, satisfies a privacy requirement for the knowledge graph to generate the privatized edges for the knowledge graph; and
generate, by combining the anonymized nodes and the privatized edges, an anonymized knowledge graph to provide data identifying new knowledge associated with a subject matter of the knowledge graph.

6. The device of claim 5, wherein the embedding space representation is a latent space graph.

7. The device of claim 5, wherein the one or more processors, when merging the second class or the third class with the first class, based on the first comparison, the second comparison, and the third comparison, to generate the anonymized nodes for the knowledge graph, are configured to:
merge the second class with the first class, based on the first comparison, the second comparison, and the third comparison, to generate a first set of anonymized nodes for the knowledge graph;
merge the third class with the first class, based on the first comparison, the second comparison, and the third comparison, to generate a second set of anonymized nodes for the knowledge graph; and
combine the first set of anonymized nodes and the second set of anonymized nodes to generate the anonymized knowledge graph.

8. The device of claim 5, wherein the anonymized nodes prevent identification of one or more of:
personal identifiers,
the quasi-identifier attributes,
insensitive attributes, or
quasi-identifier predicates.

9. The device of claim 5, wherein the one or more processors are further configured to:
increase a value associated with the predefined parameter to increase an anonymization associated with the anonymized nodes for the knowledge graph.

10. The device of claim 5, wherein the one or more processors are further configured to:
provide the knowledge graph, with the anonymized nodes, for display to a client device;
receive, from the client device, feedback associated with the knowledge graph; and
increase a value associated with the predefined parameter, based on the feedback, to increase an anonymization associated with the anonymized nodes for the knowledge graph.

11. A non-transitory computer-readable medium storing a set of instructions, the set of instructions comprising:
one or more instructions that, when executed by one or more processors of a device, cause the device to:
receive a knowledge graph, a predefined parameter, a sensitivity parameter, a noise multiplier parameter, and an acceptance value;
select a set of triples in the knowledge graph, by processing the knowledge, each triple in the set of triples including a quasi-identifier relation;
generate an equivalence first class based on the set of triples in the knowledge graph;
determine a quantity of quasi-identifier attributes in the first class;
generate a first comparison, by comparing the quantity of quasi-identifier attributes to the predefined parameter;
generate an embedding space representation, by processing the set of triples of embed the knowledge graph with a knowledge graph embedding model;
identify a similar neighbor second class for the equivalence class;
determine a first quantity of nodes in the first class and the second class;
generate a second comparison, by comparing the first quantity of nodes in the first class and the second class to the predefined parameter;
identify a similar neighbor third class;
determine a second quantity of nodes in the first class and the third class;
generate a third comparison, by comparing the second quantity of nodes in the first class and the third class to the predefined parameter;
generate anonymized nodes for the knowledge graph, by merging the second class or the third class with the first class, based on the first comparison, the second comparison, and the third comparison,
wherein merging further comprises:
based on the second comparison, merge the second class with the first class, if the first quantity of nodes is minimized above the predefined parameter;
based on the third comparison, merge the third class with the first class, if the second quantity is minimized above the predefined parameter;
generate privatized edges for the knowledge graph based on a differential privacy model, wherein generating the privatized edges for the knowledge graph further comprises:
generating, by analyzing the set of triples in the knowledge graph and based on the sensitivity parameter, a first set of sensitive triples and a second set of non-sensitive triples, wherein the sensitivity parameter comprises a sensitivity value associated with the differential privacy model to be applied to the knowledge graph;
converting, by processing the first set of sensitive triples using a first stochastic descent model, the first set of sensitive triples into a first embedding space;

converting, by processing the second set of non-sensitive triples using a second stochastic descent model, the second set of non-sensitive triples into a second embedding space;

generating a noisy first embedding space, by adding parameterized Gaussian noise using the noise multiplier parameter to the first embedding space;

determining, by processing the noisy first embedding space with the differential privacy model, a differential privacy epsilon score; and determining, by comparing the differential privacy epsilon score to the acceptance value, satisfies a privacy requirement for the knowledge graph to generate the privatized edges for the knowledge graph; and generate, by combining the anonymized nodes and the privatized edges, an anonymized knowledge graph to provide data identifying new knowledge associated with a subject matter of the knowledge graph.

12. The non-transitory computer-readable medium of claim 11, wherein the one or more instructions further cause the device to:

provide the anonymized knowledge graph for display.

13. The non-transitory computer-readable medium of claim 11, wherein the one or more instructions, that cause the device to embed the knowledge graph to generate the embedding space representation, cause the device to:

process the set of triples in the knowledge graph, with the knowledge graph embedding model, to generate the embedding space representation.

14. The non-transitory computer-readable medium of claim 11, wherein the one or more instructions, that cause the device to merge the second class or the third class with the first class, based on the first comparison, the second comparison, and the third comparison, to generate the anonymized nodes for the knowledge graph, cause the device to:

merge the second class with the first class, based on the first comparison, the second comparison, and the third comparison, to generate a first set of anonymized nodes for the knowledge graph;

merge the third class with the first class, based on the first comparison, the second comparison, and the third comparison, to generate a second set of anonymized nodes for the knowledge graph; and combine the first set of anonymized nodes and the second set of anonymized nodes to generate the anonymized knowledge graph.

15. The non-transitory computer-readable medium of claim 11, wherein the one or more instructions further cause the device to:

increase a value associated with the predefined parameter to increase an anonymization associated with the anonymized nodes for the knowledge graph.

16. The non-transitory computer-readable medium of claim 11, wherein the one or more instructions further cause the device to:

provide the knowledge graph, with the anonymized nodes, for display to a client device; receive, from the client device, feedback associated with the knowledge graph; and increase a value associated with the predefined parameter, based on the feedback, to increase an anonymization associated with the anonymized nodes for the knowledge graph.

* * * * *